United States Patent
Randimbivololona et al.

(10) Patent No.: US 8,650,547 B2
(45) Date of Patent: Feb. 11, 2014

(54) METHOD FOR DEBUGGING OPERATIONAL SOFTWARE OF A SYSTEM ONBOARD AN AIRCRAFT AND DEVICE FOR IMPLEMENTING THE SAME

(75) Inventors: Famantanantsoa Randimbivololona, Toulouse (FR); Philippe Le Meur, Toulouse (FR); Florent Fournier, Fonsorbes (FR); Vincent Bregeon, Portet sur Garonne (FR)

(73) Assignee: Airbus Operations SAS, Toulouse (FR)

( * ) Notice: Subject to any disclaimer, the term of this patent is extended or adjusted under 35 U.S.C. 154(b) by 551 days.

(21) Appl. No.: 12/678,142

(22) PCT Filed: Sep. 12, 2008

(86) PCT No.: PCT/FR2008/051649
§ 371 (c)(1),
(2), (4) Date: Sep. 3, 2010

(87) PCT Pub. No.: WO2009/047435
PCT Pub. Date: Apr. 16, 2009

(65) Prior Publication Data
US 2011/0016358 A1   Jan. 20, 2011

(30) Foreign Application Priority Data

Sep. 14, 2007   (FR) .................................... 07 57608

(51) Int. Cl.
*G06F 9/44* (2006.01)

(52) U.S. Cl.
USPC ............................. 717/127; 717/124; 717/131

(58) Field of Classification Search
None
See application file for complete search history.

(56) References Cited

U.S. PATENT DOCUMENTS

| | | | | |
|---|---|---|---|---|
| 5,428,618 A | * | 6/1995 | Ueki et al. | 717/124 |
| 5,870,607 A | * | 2/1999 | Netzer | 717/127 |
| 6,832,367 B1 | * | 12/2004 | Choi et al. | 717/130 |
| 7,627,857 B2 | * | 12/2009 | Rokosz | 717/124 |
| 7,770,156 B2 | * | 8/2010 | Thekkath | 717/128 |
| 7,836,430 B2 | * | 11/2010 | Shebs | 717/124 |
| 7,849,450 B1 | * | 12/2010 | Rydh et al. | 717/131 |

(Continued)

FOREIGN PATENT DOCUMENTS

| | | |
|---|---|---|
| JP | HEI 9-91031 | 4/1997 |
| JP | HEI 11-184728 | 7/1999 |

(Continued)

OTHER PUBLICATIONS

Zhang et al.Dynamic slicing long running programs through execution fast forwarding, SIGSOFT '06/FSE-14, Nov. 5-11, 2006, pp. 81-91, Retrieved on [Jul. 12, 2012] Retrieved from the Internet: URL<http://dl.acm.org/citation.cfm?id=1181786>.*

(Continued)

*Primary Examiner* — Thuy Dao
*Assistant Examiner* — Cheneca Smith
(74) *Attorney, Agent, or Firm* — Dickinson Wright PLLC

(57) ABSTRACT

A method for debugging the program of operational software of an onboard system, including flagging the program by positioning flags along an execution path for dividing the aforementioned execution path into adjacent functional intervals; normal execution of the program; acquiring an execution condition of the program by flag condition vectors; when an error is detected, searching a faulty functional interval based on the flag condition vectors, reverse execution of the program in the aforementioned faulty functional interval, and determination and correction of the error.

8 Claims, 3 Drawing Sheets

(56) References Cited

U.S. PATENT DOCUMENTS

| | | | |
|---|---|---|---|
| 8,104,022 B2* | 1/2012 | Krauss | 717/127 |
| 8,176,475 B2* | 5/2012 | Kosche et al. | 717/127 |
| 2003/0056199 A1* | 3/2003 | Li et al. | 717/127 |
| 2004/0078784 A1 | 4/2004 | Bates et al. | |
| 2006/0085764 A1 | 4/2006 | Klementiev | |
| 2006/0206873 A1* | 9/2006 | Argade | 717/135 |
| 2008/0127120 A1* | 5/2008 | Kosche et al. | 717/131 |
| 2008/0209406 A1* | 8/2008 | O'Callahan | 717/131 |

FOREIGN PATENT DOCUMENTS

| | | |
|---|---|---|
| JP | 2000-172523 | 6/2000 |
| JP | 2002-207611 | 7/2002 |
| JP | 2004-94800 | 3/2004 |
| JP | 2006-114049 | 4/2006 |
| JP | 2006-139440 | 6/2006 |

OTHER PUBLICATIONS

Hendrickson et al. An (architecture-centric) approach for tracing, organizing, and understanding events in event-based software architectures,13th International Workshop on Program Comprehension, 2005, pp. 227-236, Retrieved on [Jul. 12, 2012] Retrieved from the Internet: URL<http://ieeexplore.ieee.org/stamp/stamp.jsp?tp=&arnumber=1421>.*

Huang et al. Software Reliability Analysis by Considering Fault Dependency and Debugging Time Lag. IEEE Transactions on Reliability, Sep. 2006, pp. 436-450, Retrieved on [Oct. 3, 2013] Retrieved from the Internet: URL<http://ieeexplore.ieee.org/xpls/abs_all.jsp?arnumber=1688079>.*

Maruyama et al.Debugging with Reverse Watchpoint. Proceedings Third International Conference on Quality Software 2003, Nov. 2003, pp. 116-123, Retrieved on [Oct. 3, 2013] Retrieved from the Internet: URL<http://ieeexplore.ieee.org/stamp/stamp.jsp?tp=&arnumber=1319093>.*

International Search Report and Written Opinion dated Jan. 26, 2010.

Michael W. Shapiro: "RDB: A system for incremental replay debugging" Research Report: Dept. of Computer Science, Brown University, Providence, Rhode Island 02912, CS-97-12,Jul. 1997, pp. 1-49, XP002475452.

Choi, Miller, Netzer: "Techniques for debugging parallel programs with flowback analysis" ACM Transactions on Programming Languages, vol. 13, No. 4, 1991, pp. 491-530, XP002472622.

Agrawal H et al: "Debugging With Dynamic Slicing and Backtracking" Software Practice & Experience, Wiley & Sons, B0gn0r Regis, GB, vol. 23, No. 6, (Jun. 1993), pp. 589-616, XP000655847. ISSN: 0038-0644.

The Intelligent Systems Laboratory: "SICStus Prolog User Manual. Release 3.7.1."[Online] (Oct. 1998), XP002475461. Swedish Institute of Computer Science, Kista, Sweden Extrait de l'Internet: URL:http://www.sics.se/s1cstus/docs/3.7html/sicstus_toc.html > [extrait le Mar. 10, 2008] Section on Debugging (Spypoints + Options available during debugging).

English translation of the Japanese Notice of the Reason for Refusal dated Nov. 1, 2011.

* cited by examiner

METHOD FOR DEBUGGING OPERATIONAL SOFTWARE OF A SYSTEM ONBOARD AN AIRCRAFT AND DEVICE FOR IMPLEMENTING THE SAME

CROSS-REFERENCE TO RELATED APPLICATIONS

This application is the National Stage of International Application No. PCT/FR2008/051649 International Filing Date, 12 Sep. 2008, which designated the United States of America, and which International Application was published under PCT Article 21 (s) as WO Publication No. WO2009/047435 A2 and which claims priority from, and the benefit of, French Application No. 200757608 filed on 14 Sep. 2007, the disclosures of which are incorporated herein by reference in their entireties.

BACKGROUND

This aspects of the disclosed embodiments relate to the field of system operational safety when the operation of these systems relies on the execution of series of logic instructions in a computer.

In particular, the disclosed embodiments relate to a method for debugging operational software of a system which must execute series of logic instructions, in particular a system with heightened safety requirements such as an electronic system aimed at being installed onboard an aircraft.

SUMMARY

The method enables a developer to be able to search for and correct errors in the series of logic instructions of operational software of onboard systems, is the disclosed embodiments are particularly advantageous in, but not exclusive to the field of aeronautics and, more particularly the field of performing tests on operational software of onboard systems.

For safety reasons, the systems aimed at being installed onboard an aircraft are subjected to checks regarding their correct operation, during which said systems must be proven to meet the certification requirements before an aircraft fitted with such systems is authorised to fly or even enter into commercial use.

Before their installation, these systems are subjected to numerous tests in order to check that they meet the integrity and safety requirements, among other requirements issued by the certification authorities. These onboard systems can in particular be specialised computers aimed at performing possibly significant operations for the aircraft, for example piloting operations. These systems will be hereinafter referred to as computers.

More often than not in current system architectures, each computer is dedicated to an application or several applications of the same nature, for example flight control applications. Each computer includes a hardware part and a software part. The hardware part comprises at least one central processing unit (CPU) and at least one input/output unit, via which the computer is connected to a network of computers, external peripherals, etc.

One essential characteristic of the onboard systems, often implemented in the field of aeronautics, is connected to an architecture, as much hardware as software, that avoids as much as possible, any means from being introduced which is unnecessary for the functions dedicated to said systems to be performed.

Thus, contrary to the systems generally found in widespread applications in aeronautics, the computer is not equipped with a complex operating system. In addition, the software is created in a language as close as possible to the language understood by the central processing unit and the only inputs/outputs available are those required for system operation, for example information originating from sensors or other aircraft elements or information transmitted to actuators or other elements.

The advantage of this type of architecture comes from the fact that the operation of such a system is more easily controlled. It is not dependant on a complex operating system, of which certain operating aspects are contingent on uncontrolled parameters and which should otherwise be subjected to the same safety demonstrations as application software. The system is simpler and less vulnerable as it only comprises the means strictly necessary for the functions of said system to be performed.

On the other hand, the operating conditions of such a system are much more difficult to detect. For example, the system does not include any conventional man/machine interfaces such as keyboards and screens, enabling the correct operation of the series of instructions to be checked, and enabling an operator to interact with this operation, which makes it difficult to perform the essential checks required during the software development, verification and qualification phases.

The software part of the computer includes a software program specific to the relevant application and which ensures the operation of the computer, whose logic instructions correspond to the algorithms that determine system operation.

In order to obtain system certification, a computer validation phase is performed prior to its use and the use of the aircraft.

In a known manner, the validation phases consists, in general, in checking, at each step of the computer execution process, that it is compliant with the specifications set so that said computer fulfills the expected system operation.

This verification phase, verifying compliance with the specifications is performed, in particular for software programs, by successive steps from checking the most simple software components to the full software program integrating all of the components to be used in the target computer.

In a first verification step, the most simple software elements capable of being tested are subjected to tests, known as unit tests. During these tests, the logic instructions, i.e. the code, of said software elements, individually taken, are checked to have been executed in compliance with the design requirements.

In a second step, known as the integration step, different software components having been individually subjected to isolated checks, are integrated in order to constitute a unit, in which the software components interact. These different software components are subjected to integration tests aimed at checking that the software components are compatible, in particular at the level of the functional interfaces between said components.

In a third step, all of the software components are integrated into the computer for which they were designed. Validation tests are then performed to prove that the software, formed by the set of components integrated into the computer, is compliant with the specifications, i.e. that it performs the expected functions, and that its operation is reliable and safe.

In order to guarantee that a software item is safe and in order to meet the certification requirements, all of the tests to which the software has been subjected must also prove, during this validation phase and with an adequate level of certainty, that the software is compliant with the safety requirements for the system in which it is incorporated.

The different tests performed on the software during the validation phase enable it to be assured that no malfunction of said software (which could have an impact on the correct operation of the computers, and therefore on the aircraft and its safety) can occur or that, if a malfunction does occur, the software is capable of managing this situation.

In any case, during the validation phase, and above all for the investigation operations for when anomalies are observed, it is often necessary to ensure that not only the input and output parameters for the computer on which the software is installed comply with the expected parameters, but also that certain internal software actions are correct.

In this event, due to the specific architecture of the specialised computers for onboard applications, it is generally very difficult to detect the software operating conditions without implementing particular devices and methods.

A first known method consists in installing a file distribution system between the computer being tested with the installed software and an associated platform by using emulators. An emulator refers to a device enabling the logic operation of a computing unit of a computer processor to be simulated on the associated platform.

In such an operating mode with an emulator, the computer processor is replaced by a probe, which creates the interface with the associated platform supporting the processor emulation.

It is thus possible to execute the software to be tested on the computer, except for the processor part, and by the functions performed by the associated platform, to detect the operating conditions or certain internal software malfunctions, for example in response to input stimulations to the input/output units, in addition to detecting the outputs of said input/output units.

This first method has numerous disadvantages. Indeed, each type of computer to be tested requires a specific test bed or at least a very specific test bed configuration. A test bed is a unit comprising in particular means for interconnecting the computer being tested with means for emulating the computer processor(s) as well as means for performing the test programs.

As each processor requires a specific emulator, as much for the emulation software as for the sensor connected in place of the processor, the emulators must be multiplied in number in compliance with the computer definitions.

Moreover, the possibilities of performing an investigation using emulators are limited in general. In addition, the necessity to work with a machine language specific to the relevant processor requires the developer to be a specialist in machine language programming.

Moreover, an emulator is an expensive product, and is generally only produced in small quantities. The life cycle of this type of product is very short (6 months to 2 years), whereas the operational maintenance of development and checking means is required (regulations, industrial reactivity) throughout the aircraft program (20 years, possibly more). This therefore creates problems in dealing with obsolescence, which are becoming more and more difficult to resolve.

This solution of using an emulator therefore appears poorly suited as, in addition to its limited performance in terms of investigation, it is both costly to install and costly to maintain.

The costs are also heightened by the fact that different models of processors are generally used to ensure functional redundancy by design safety, therefore equally multiplying the emulator needs.

A second method, aiming at overcoming the emulator problems, consists in simulating, on a host platform, the operation of the computer used to run the program being tested. In this event, the software being tested must be able to access the files on the host platform, either to read the test vectors or to record the test results.

As the software being tested does not naturally include the functions for such access to the host platform files, the software being tested must be modified in order to integrate these access functions.

In order to transfer information, system call instructions are normally used, which are transmitted by the simulated test environment. The system call instructions can be, for example, the opening of a file, the writing of a file or even the reading of a file. The system call instructions are intercepted by the host platform operating system, which converts them into host platform system calls.

This second method also has its disadvantages. Indeed, the variety of files is such that the development of access functions is extremely dependent on the host platform and its operating system. However, the variability of the host platforms is as important spatially (in the event where development teams are located around the world) as temporally (re-placement of host platforms), which poses practical difficulties for implementing the method.

These difficulties are accentuated as skilled experts are required, capable of modifying the functions of the operating system in order to develop such access functions to the file systems, and therefore cannot be referred to test specialists.

Therefore, this method proves to be both costly and difficult to implement.

Moreover, this method is very intrusive with regard to the software being tested and modifying software in order to perform tests presents a risk of disturbing the software operation itself.

During the computer software validation and verification phase, the execution of tests can reveal errors, which manifest themselves by either stopping the running of the operational software or by the fact that one or several test cases produced erroneous results. The developer must therefore search for anomalies or errors in the lines of instruction codes in order to correct these errors. This search is performed by an operation in which the succession of points of the execution path appear in an order inverse to that of normal execution. In other words, a sequence of lines of codes is retraced backwards, the error being sought within these lines of codes (i.e. a sequence of lines of codes already executed but containing one or more errors is retraced), and the retraced sequence is re-executed. This search is known as reverse execution.

This reverse execution operation requires the developer to understand the lines of instruction codes at any point of an execution path of the operational software, formed from a succession of lines of instruction codes. However, the developer does not know where in the execution path the error is located. He/she therefore does not know how many lines of codes for which the reverse execution operation must be performed. In addition, for onboard software, the reverse execution operation must be performed in the same language as normal execution, i.e. in machine language. It is therefore difficult for the developer to understand the running of the operational software program in sufficient detail in order to retrace the line sequence and locate the error. Moreover, there are no means for controlling or monitoring the reverse execution operation in order to enable the developer to know up to what point the faulty chain must be retraced in order to locate the error or anomaly.

Taking into account its complexity, this error search requires a considerable amount of time, which may range from several hours to several days, which causes a relatively high cost for the debugging phase in terms of productivity and labour. This is due to the fact that current debugging tools do not offer any means for efficiently supporting the reverse execution operation: this involves retracing either n units in time (generally in seconds) or n computing steps. There is no functional connection with the logic of the software being debugged. The efficiency of the reverse execution operation is therefore considerably reduced or even completely annihilated if this involves a software item with complex logic as is generally the case for onboard software.

The purpose of the disclosed embodiments is to overcome the disadvantages of the techniques previously described. To this end, the disclosed embodiments relate to a method for debugging operational software, enabling a developer to be able to easily locate the position of an error or anomaly in the series of instructions written by the developer. In order to achieve this, the method of the disclosed embodiments refers to structuring the execution operation for an operational software program by functionally sequencing the execution path. This functional sequencing is performed by positioning flags in specific positions in the normal execution path of the program in such a way as to divide the program into functional units, which enables the developer to locate the position from which a reverse execution operation must be performed. This sequencing operation can be performed in an interactive or automatic manner.

More precisely, the disclosed embodiments relate to a method for debugging an operational software program of an onboard system, characterised in that it comprises the following steps:
 a) flagging the program by positioning flags along an execution path in order to divide said execution path into adjacent functional intervals,
 b) normal execution of the program,
 c) acquiring an execution state of the program using the flag state vectors,
 d) when an error is detected:
  searching for a faulty functional interval based on the flag state vectors,
  reverse execution of the program within this faulty functional interval,
  determination and correction of the error.

The method of the disclosed embodiments can also comprise one or several of the following characteristics:
 an error is detected when the program stops, following a processor exception error.
 it comprises an operation for refining the functional interval in which the error is located.
 the operation for refining the functional interval comprises determining additional entry and exit flags and/or intermediary flags.
 the step of searching for the faulty functional interval is performed automatically.
 the step of searching for the faulty functional interval is performed interactively via an intervention by the developer.
 it comprises a step of recording the position of each flag and the information on the execution state of the program in a results file on a host platform.

The disclosed embodiments also relate to a device simulating the operation of a system onboard an aircraft, characterised in that it comprises a processor implementing a method as previously defined.

The device of the disclosed embodiments can comprise the following characteristic:
 the processor is virtually simulated on a testing and debugging host platform.

The disclosed embodiments also relate to an operational program for a system onboard an aircraft, which can be loaded onto a control unit including instruction sequences for implementing the method as previously defined, when the program is loaded onto the unit and is executed.

The disclosed embodiments will be better understood after reading the following description and after examining the accompanying figures. These are presented as a rough guide and in no way as a limited guide to the disclosed embodiments.

DETAILED DESCRIPTION

Operational software is comprised of a set of programs. A program being comprised of a set of written series of instructions, hereinafter referred to as an instruction chain. The method according to the disclosed embodiments refers to positioning markers in the execution path of the operational software program of the onboard system so as to be able to determine, with respect to these markers, the location of the error or anomaly.

Figure 1:
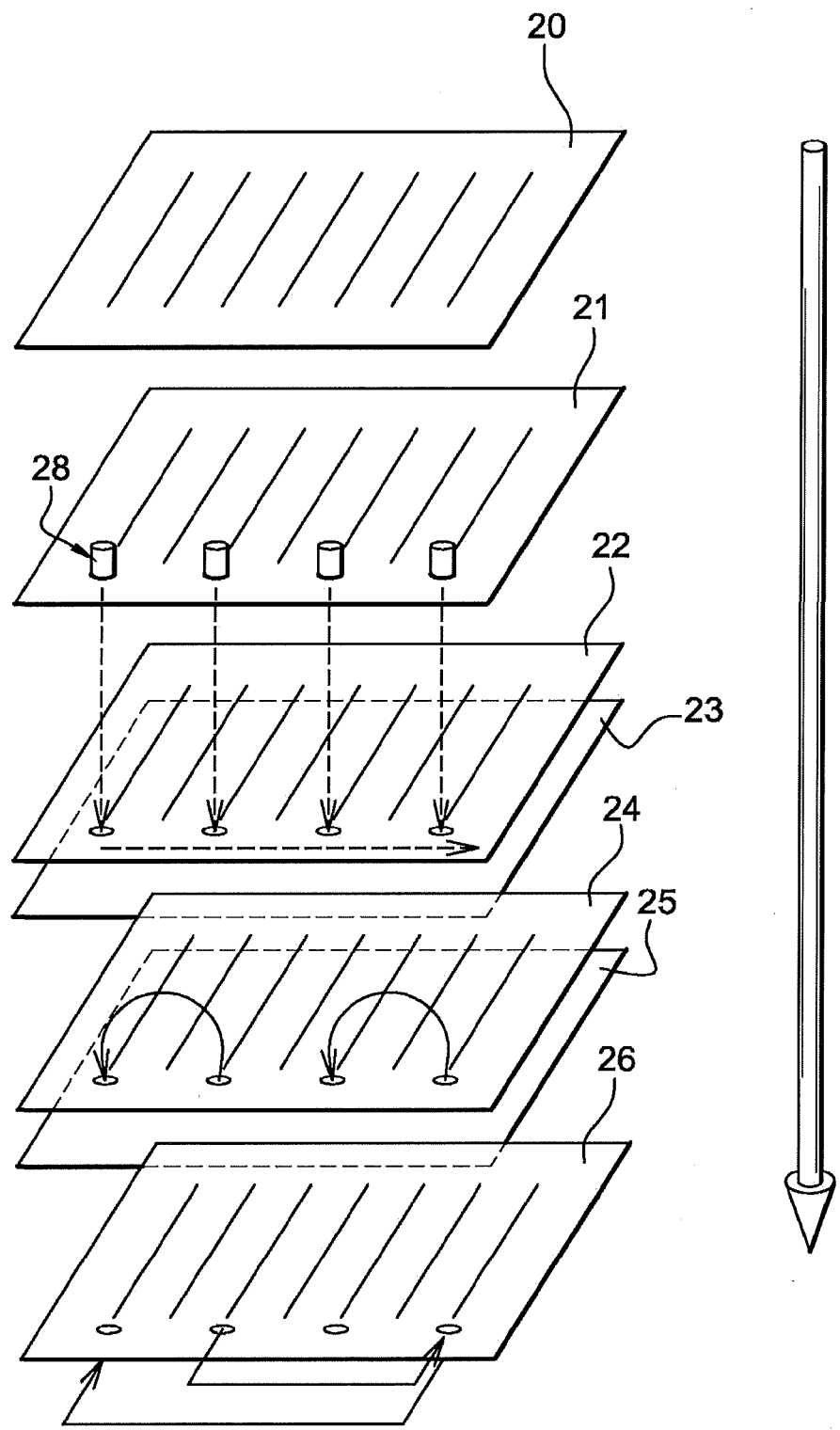
FIG. 1 is a schematic representation of the program according to the disclosed embodiments.

FIG. 1 is a schematic representation of the different phases of this method. Each phase in FIG. 1 represents the program of the operational software of the onboard system at a different step of the method of the disclosed embodiments. The first phase in FIG. 1 is an example of the program before application of the method of the disclosed embodiments. This program, reference 20, includes a set of instruction chains, 20-1 to 20-n.

These instruction chains, executed in their order of occurrence, i.e. from instruction 20-1 to instruction 20-n, constitute the normal execution path of the program.

The second phase in FIG. 1 represents program 21, which corresponds to program 20 after flags 28 have been positioned. Flags 28 are virtual markers positioned in specific positions in the program. These positions preferably correspond to the beginning and/or end of the different program functions. Flags 28 are positioned, for example, at an entry point or an exit point of a program function. Positioning the flags at the entry or exit points of each program function is referred to as positioning the flags according to a functional sequence.

The flags can also be positioned in any other predefined position in the execution path, for example at a program fault point, at the level of the data flows or at the level of the control flow. The flags constitute markers in the execution path of the program. The flags thus constitute markers in the running of the execution path of the program when one or several anomaly(ies) or error(s) are detected, which is manifested either by erroneous results, an interrupt in the running of the program or by an infinite execution loop.

An anomaly or error can be functional. In this event, the method sends the developer an invitation to correct said anomaly or error.

The anomaly or error can also be of a nature to cause loss of control of the running of the program. Such an error can be, for example, an arithmetic overflow of the processor, leading to, for example, the presence of a pointer positioned over a forbidden area. In this event, the execution of the program is interrupted. An interrupt consecutive to an arithmetic overflow is referred to as a processor exception interrupt.

The functional sequencing of the execution path described in the disclosed embodiments enables this type of processor exception interrupt error to be detected and corrected. In order to achieve this, the sequencing according to the disclosed embodiments divides the execution path of the program into adjacent functional intervals. The functions are executed one after the other. In one mode of embodiment of the disclosed embodiments, a flag is positioned at the start of each function. Each flag comprises a state vector corresponding to the image from the memory. This state vector indicates the state of the memory in a predefined position, i.e. in the position where the flag is located, which enables the memory to be reset at a later time with information from the state vector.

At the start of the running of the program, all of the flags are deactivated. The state vector for each of these flags is neutral or deactivated, i.e. it does not contain any information. Each time a function has been executed normally, the flag located at the entry point of the following function changes state by becoming activated. The state vector of the flag thus acquires an execution state of the program, i.e. it acquires the information recorded in the system memory at this level of execution of the program.

The sequencing operation can be performed automatically, i.e. a flag is positioned automatically at the start of each functional interval. It can also be performed interactively, i.e. the developer can choose to position additional flags within the same function. These additional flags can be entry flags, exit flags and/or intermediary flags. The choice of automatic or interactive sequencing is made by the developer him/herself. Interactive sequencing enables the search and correction interval for an error to be refined, which enables said interval to be reduced and therefore eases the error detection process.

A third phase in FIG. 1 represents program 22 corresponding to program 21 during an execution operation of said program in normal mode. This execution operation in normal mode, referred to as normal execution, corresponds to the logical running of the program, instruction by instruction, beginning with the first instruction line 20-1.

A fourth phase in FIG. 1 represents program 23 corresponding to program 21 when the information regarding the execution state of the program and the position of the flags has been acquired. Indeed, during normal execution of the program, the flag located at the end of a normally executed function is activated. The state vector of this flag acquires or memorises the state of the memory at this level of execution of the program.

During a program interrupt, the last activated flag indicates the function where a program interrupt has occurred. The state vector of this flag enables the execution state to be located, in which the program was operating when the faulty function was executed.

In order to enable information to be acquired by the state vectors, a tool observing the normal execution operation determines the traffic over the flags, in their normally occurring order, i.e. as per normal execution of the instruction lines of the program. When a flag has been crossed, the observation tool acquires the state of the memory in the state vector of the last flag encountered and records this information in a data memory 4.

When an error occurs, the developer performs a reverse execution operation of the program in order to locate said error within the program. The fifth phase in FIG. 1 represents program 24 corresponding to program 23 during this reverse execution operation. This reverse execution operation enables the program to be retraced backwards when compared to the normal running of the program in order to reset the execution operation back to the first instruction line of the function corresponding to the last activated flag, i.e. the last function whose state vector was acquired.

In other words, the reverse execution operation is performed according to the flags in order to retrace the instruction chain of the program and determine the location of the faulty instruction chain. The reverse execution operation can thus be performed within a single functional interval. When a faulty chain or error has been detected within this functional interval, the developer searches for the error or anomaly within this chain and corrects it.

Thanks to the flags, the developer is able to easily locate the faulty instruction chain. When an error has been corrected, the developer can continue the reverse execution operation in order to detect other possible errors. Indeed, with the method of the disclosed embodiments, the execution path is structured is such a way that several errors or anomalies can be detected and corrected within a single program debugging phase.

The debugging phase previously described, i.e. the phase of searching for and correcting an error, is represented by program 25 in FIG. 1.

When an error has been fixed and when the developer would like to move onto a following or previous error, he/she can use an interactive phase. In this interactive phase, program 26 comprises an interactive sequencing operation thanks to which the developer can skip from one functional interval to another.

Figure 2:
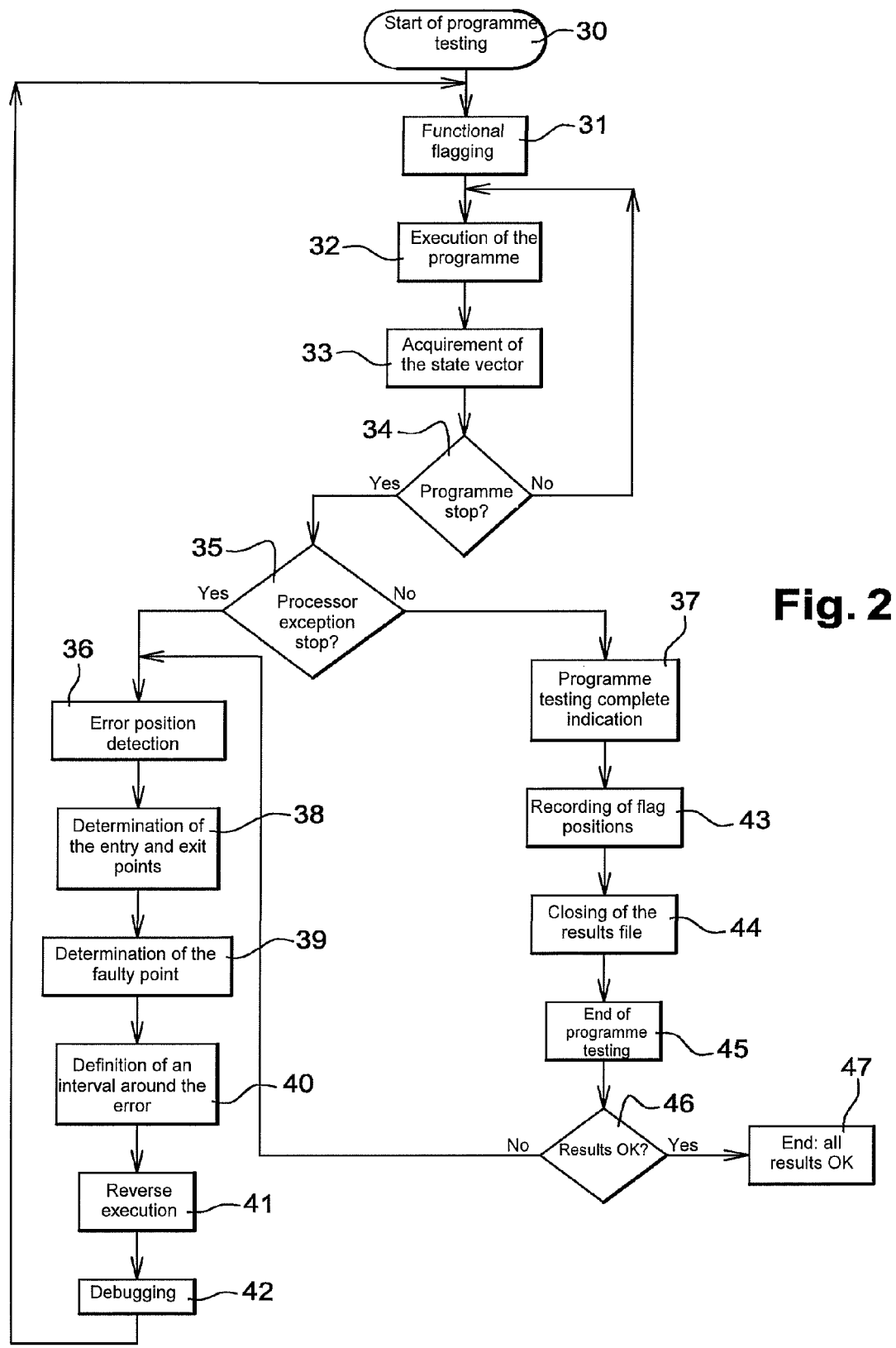
FIG. 2 illustrates an operational diagram of the method of the disclosed embodiments.

FIG. 2 illustrates in detail the different steps of the method of the disclosed embodiments. The functional diagram in FIG. 2 shows a preliminary step 30, in which a test environment control unit detects whether a debugging phase has been requested by the developer.

If the developer would like to perform a debugging operation, the test environment control unit performs, in step 31, a flagging operation of the program by positioning flags along the execution path in order to divide said execution path into adjacent functional intervals. Each flag comprises an activated or deactivated state vector, as previously explained. The flag state vector is referred to as activated when the information relating to the execution state of the program has been acquired. Thus, a flag state vector is activated when the function preceding the flag has been performed without error. It remains deactivated if the opposite occurs.

In step 32, the control unit launches the normal execution of the program.

In step 33, the control unit acquires the state information in the flag state vectors so as to know the execution state of the program.

In step 34, the control unit detects whether an interrupt in the execution of the operational software program has occurred. If the program stops functioning, an error or anomaly has been detected. Step 35 is then applied. If no interrupt has occurred, the normal execution operation continues and steps 32 and 33 are repeated.

Step 35 determines whether the interrupt occurred is a processor exception interrupt. If this is the case, step 36 is then applied. If this is not the case, step 37 is applied. In this event, a message is transmitted to the developer in order to inform him/her that the execution operation for the program has ended, either because a functional error has been detected or because the normal execution operation has been completed without error.

The method therefore continues in step 43, in which the control unit records the position of the flags in a test results file in order to enable the execution path to be consulted at a later date.

In step 44, the test results file is closed. Step 45 is a final step indicating the end of the test or the end of the execution operation of the program.

If a processor exception has been detected in step 35, step 36 searches for the first deactivated flag in the normal path in order to calculate the functional interval in which the faulty chain is located. Step 38 is then applied. In step 38, the developer can implant, in an interactive manner, additional entry flags, exit flags and/or intermediary flags in order to refine the search interval for the error within the functional interval determined in step 36. In step 39, the fault points are detected within the data flows or control flows. These fault points enable the interval around the error to be further refined. After determining these faulty points, step 40 defines a fault interval around the error.

It must be noted that steps 38 to 40 constitute a preferred mode of embodiment of the disclosed embodiments, in which the interval around the error is reduced in order to ease the error search process during the reverse execution operation.

In any case, the method can involve simply passing from step 36 of detecting the inactive flag to step 41 of the reverse execution operation. In this event, the developer must perform the reverse execution operation on the entire function in which the error has been detected.

In step 41, the reverse execution operation is launched enabling the developer to retrace the program back to the function where the faulty program instruction chain was detected. In one mode of embodiment of the disclosed embodiments, the reverse execution operation is performed between two successive flags (interval). This corresponds in most cases to the beginning and the end of the faulty function. There are no particular restrictions preventing the developer from skipping from one interval to another. In another mode of embodiment, the reverse execution operation is performed on an interval refined around the error, i.e. on only one part of the function.

In step 42, the developer performs the debugging operation for the error, i.e. he/she locates the error within the faulty functional interval and corrects it. When the debugging step 42 is complete, the method is repeated from step 31 in order to check whether the program can be correctly executed.

If the control unit does not detect any further processor exception interrupt, the control unit sends the developer a message indicating that the program debugging phase is complete (step 37).

The method according to the disclosed embodiments can be implemented in a test environment of the system virtually simulated on a host platform. It can also be installed on a workstation connected to an actual onboard system via a dedicated operational emulator. In this event, the position of the flags and/or the state vectors are recorded (step 43) on a medium that can be accessed by the developer, for example, in a results file on the host platform. When all of the flag positions have been recorded, the results file is closed (step 44) and the test is complete (step 45). A check is performed for all of the results (step 46). When all of the results are correct or OK, the final step 47 indicates that all of these results are OK. If all of the results are not OK, steps 36 to 42 are repeated.

Figure 3:
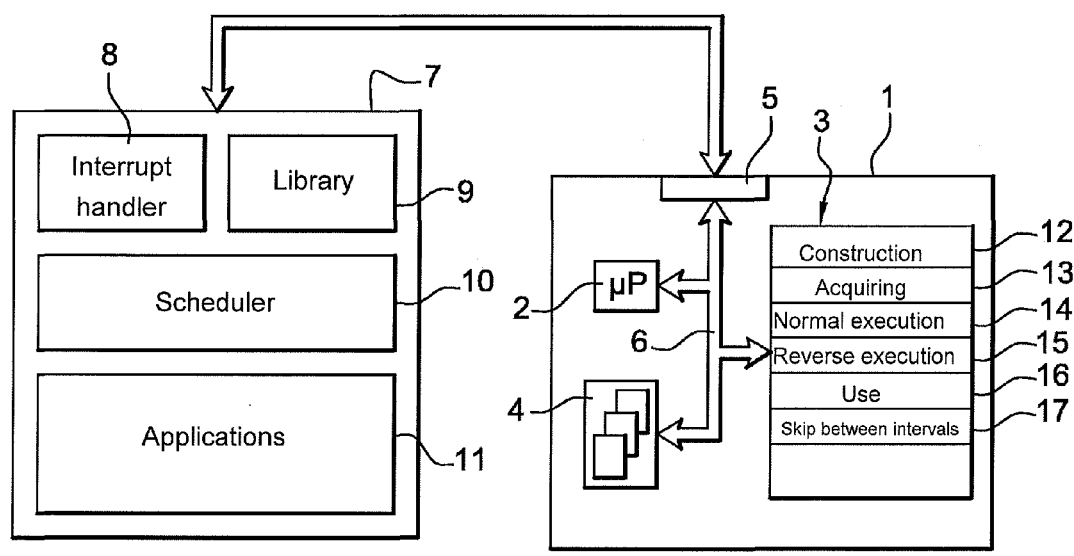
FIG. 3 is a schematic representation of a test environment in the debugging phase of operational software of an onboard system.

FIG. 3 shows an example of a test environment control unit 1 of the operational program of the onboard system, implementing the method according to the disclosed embodiments. Control unit 1 comprises a processor 2, a program memory 3, a data memory 4 and an input/output interface 5. Processor 2, program memory 3, data memory 4 and input/output interface 5 are connected to each other via a bidirectional communication bus 6.

A program 7 is executed by processor 2 by using the chains of instruction codes installed in program memory 3. The purpose of program 7 is to pilot and control the operation of the onboard system. Program 7 comprises, in a non-exhaustive manner, an interrupt handler 8, a library 9, a scheduler 10 and a set of applications 11.

Library 9 comprises a collection of control functions activated by program 7. The purpose of interrupt handler 8 is to react in real time to the unexpected requests from processor 2, but also to ensure multi task cohabitation of the test environment. The scheduler 10 is a service program enabling an order of priority to be automatically determined in the processing of tasks that processor 2 must perform, according to various priority criteria and to the available resources.

Program memory 3 comprises, in an area 12, instructions enabling a functional sequencing operation of program 7 to be built, as previously described, and to indicate the position of the error or anomaly encountered so as to correct it.

Program memory 3 comprises, in an area 13, instructions for acquiring the state vectors for the flags in program 7. The position of each activated flag as well as its state vector is recorded in data memory 4.

Program memory 3 comprises, in an area 14, instructions for launching the normal execution of program 7. The execution of program 7 of the operational software is performed in sequences, instruction by instruction, and progressively causes the activation of the flag state vectors. When an error occurs within a function, the execution of program 7 is stopped. The flag state vectors located after the function where the error has been located are not activated. The state vector of the last activated flag therefore constitutes a marker, indicating the position of the faulty function, i.e. the function containing the error.

Program memory 3 comprises, in an area 15, instructions for launching a reverse execution operation. The reverse execution operation enables, when an error has been detected, to retrace the program back to the function containing the faulty instruction. The developer positions him/herself over the flag associated with the last activated state vector in order to restart the execution operation of the function. Thus, the developer only performs the reverse execution operation on the faulty function.

Program memory 3 comprises, in an area 16, instructions enabling the information collected via the flags to be used. These instructions enable program 7 to be debugged.

Program memory 3 comprises, in an area 17, instructions enabling the developer to skip between functional intervals. In other words, the instruction codes in area 17 enable the developer to skip from one functional interval to another, whether program 7 is being run in normal execution or reverse execution mode.

Using the information previously given, it is therefore deduced that the functional sequencing operation of the disclosed embodiments enables software to be efficiently debugged as it offers a means of locating the faulty instruction chains in order to limit the reverse execution operation to a single function. Moreover, it enables several errors to be corrected within a single debugging phase.

The invention claimed is:

1. A processor-implemented method for debugging operational software of an onboard system, comprising:
   flagging a program by positioning flags along an execution path in order to divide said execution path into adjacent functional intervals, each flag comprising a flag state vector,
   normal execution of the program,
   at an end of each functional interval, acquiring an execution state of the program using the flag state vector of an associated flag,
   when an error is detected:
      identifying a faulty functional interval by identifying a flag having a flag state vector with no execution state information,
      reverse execution of the program within the faulty functional interval,
      determination and correction of the error,
   the method further comprising an operation for refining the faulty functional interval, the operation comprising positioning additional flags within the faulty functional interval.

2. A method according to claim 1, wherein an error is detected when the program stops, following a processor exception error.

3. A method according to claim 1, wherein searching for the faulty functional interval is performed automatically.

4. A method according to claim 1, wherein searching for the faulty functional interval is performed interactively via an intervention by a developer.

5. A method according to claim 1, comprising recording a position of each flag and the execution state of the program in a results file on a host platform.

6. A device simulating the operation of a system onboard an aircraft, comprising a processor implementing the method according to claim 1.

7. A device according to claim 6, wherein the processor is virtually simulated on a testing and debugging host platform.

8. An operational program including instruction sequences for a system onboard an aircraft, the program being stored in a non-transitory memory of a control unit and the program executing said instruction sequences for implementing the method according to claim 1.

* * * * *